United States Patent

[11] 3,599,824

| [72] | Inventors | Frederick C. Pneuman<br>Bellevue, Wash.;<br>Charles Y. Hale, Mountlake Terrace, both of, Wash. |
|---|---|---|
| [21] | Appl. No. | 825,634 |
| [22] | Filed | May 19, 1969 |
| [45] | Patented | Aug. 17, 1971 |
| [73] | Assignee | Weyerhaeuser Company<br>Tacoma, Wash. |

[54] COUPLING DEVICE FOR CARGO CONTAINERS
7 Claims, 6 Drawing Figs.

[52] U.S. Cl. ................................................. 220/23.4, 24/81 E
[51] Int. Cl. ........................................................ B65d 21/02
[50] Field of Search............................................. 24/81 E; 220/23.2, 23.4, 1.5

[56] References Cited
UNITED STATES PATENTS

| 2,930,091 | 3/1960 | Imparato | 24/81 E UX |
| 2,972,175 | 2/1961 | Abolins | 220/23.4 X |

*Primary Examiner*—George E. Lowrance
*Attorney*—Christensen & Sanborn

ABSTRACT: A coupling device is disclosed for interconnecting cargo containers having pairs of spaced oppositely disposed lugs thereon. The coupling device is interengaged with and between the lugs of the containers, and is particularly adapted for rigidly interconnecting a pair of spaced mutually aligned modular USASI/ISO or similar cargo containers having standard hollow slotted fittings in the opposing corners thereof, in which case of such device is interposed between each pair of opposing corner fittings and interengaged with and between opposing edge portions of the slotted end openings in the fittings.

INVENTORS
FREDERICK C. PNEUMAN
CHARLES Y. HALE
BY
Christensen, Sanborn
and Matthews
ATTORNEYS

COUPLING DEVICE FOR CARGO CONTAINERS

FIELD OF THE INVENTION

This invention relates to coupling devices for interconnecting two or more bodies which have pairs of spaced oppositely disposed lugs thereon. In particular, the invention relates to coupling devices for rigidly interconnecting modular USASI/ISO cargo containers equipped with standard hollow slotted fittings in the corners thereof.

BACKGROUND OF THE INVENTION INCLUDING CERTAIN OBJECTS THEREOF

All containers conforming to USASI/ISO sizes and standards, and in addition, many other containers, have hollow castings in the corners thereof, the exposed faces of which have slotted openings therein to receive various types of handling and restraint devices. According to the invention, the edge portions of these openings can be employed as pairs of spaced, oppositely disposed lugs with which to couple the containers together.

One object of the present invention is to provide a coupling device whereby cargo containers equipped with such castings or fittings, or with other such pairs of spaced, oppositely disposed lugs, can be handled with greater ease and efficiency. Another object is to provide a coupling device of this nature whereby containers which are so equipped can be interconnected with one another in composite assemblies of the same. A still further object is to provide a coupling device of this nature whereby such containers can be stored in a more efficient and expeditious manner, as for example, where they are interconnected in a composite assembly of the same, and loaded and unloaded into and from a cell or compartment sized and disposed to receive the full assembly in a single handling operation. Still another object is to provide a coupling device of this nature which can be interchanged between the top and bottom castings of the aforedescribed modular USASI/ISO containers, so as to simplify the manufacture and use of the same. Other objects include the provision of a coupling device of this nature which is simple and rugged in design, which is easy to install and remove, and which is capable of withstanding the high compression, tension, and transmitted shear forces which are generated when for example, two 20-foot long modular containers are interconnected with one another and handled as a substantially rigid 40-foot unit. Still further objects will become apparent from the description of the invention which follows hereafter.

SUMMARY OF THE INVENTION

These objects and advantages are realized by a coupling device of our invention which in its preferred form comprises a pair of elongated interlock members which have mutually opposing longitudinal faces thereon, and are relatively displaceable along a normal therebetween. The interlock members also have oppositely disposed recesses in the corresponding longitudinal end portions thereof, and a spindle operatively interposed therebetween. One of the members is rotatably engaged on the spindle, whereas the other member is threadedly interconnected with it. In addition, the spindle has a stop thereon, at a point between the members, whereby the one member can be forcibly separated from the other member by rotating the spindle against the threading thereon.

In use, the members are interposed with one another in the clearance between a pair of spaced mutually aligned containers equipped with lugs as aforementioned; and the corresponding longitudinal end portions of the members are inserted in the spaces between the lugs and the spindle is rotated to engage the lugs in the recesses thereof. The spindle also has a stop on the opposite side of the one member from the other, to interconnect the members so that they are relatively displaceable toward one another. Thus, the members can be readily engaged and disengaged from the containers by turning the spindle against the threaded member.

In the preferred embodiments of the invention, the members have mutually aligned bores therein, and a machine bolt is rotatably journaled in the bores in threaded engagement with the bore of the threaded member. A flange on the unthreaded shank of the bolt operates to separate the one member from the other by rotating the bolt. The recesses are formed by spaced part circumferential grooves in the members which register with one another when the members are abutted. The lugs engage in opposite angular segments of the grooves, and preferably bear against the neck or bottom of the grooves over the full part circumferential extent thereof, particularly in the case where the coupling device is employed in tension.

BRIEF DESCRIPTION OF THE DRAWINGS

These features will be better understood by reference to the accompanying drawings wherein one of the preferred embodiments of the invention is illustrated.

In the drawings.

DESCRIPTION OF THE PREFERRED EMBODIMENT

Figure 1:
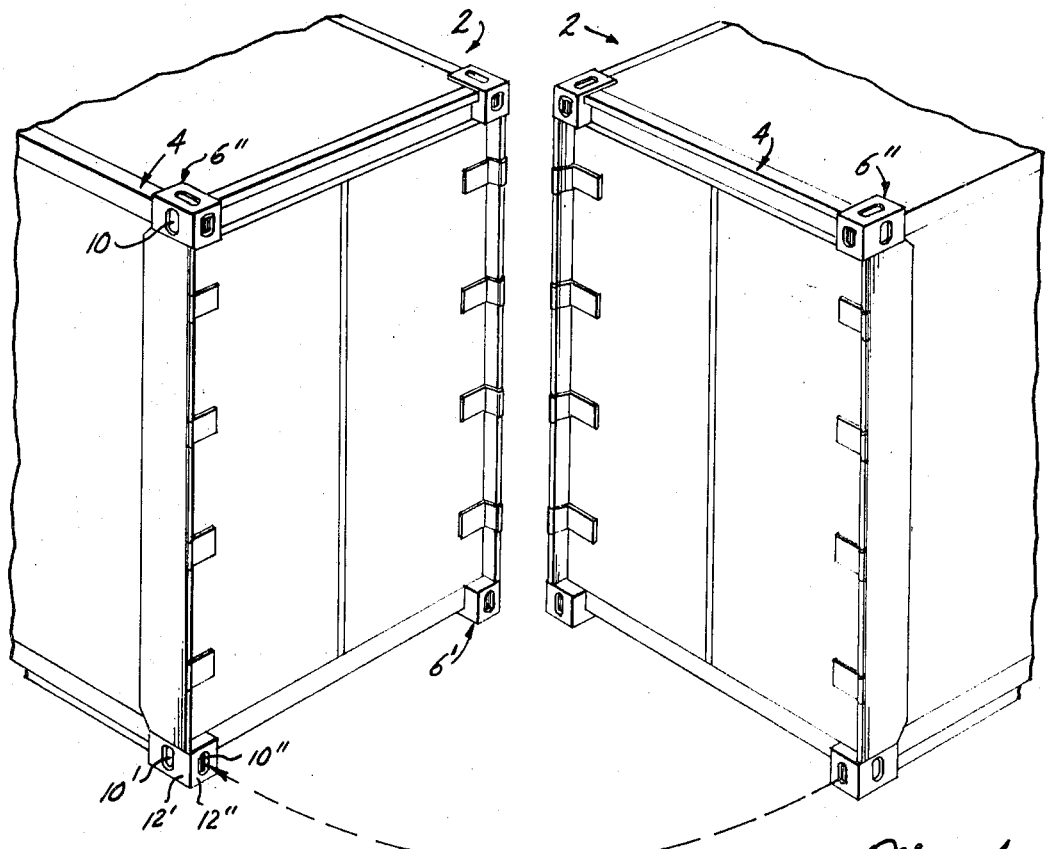
FIG. 1 is a part perspective view of a pair of 20-foot USASI/ISO Standard Group I modular cargo containers equipped with slotted corner fittings by which the containers may be coupled together when swung into alignment with one another.
Figure 2:
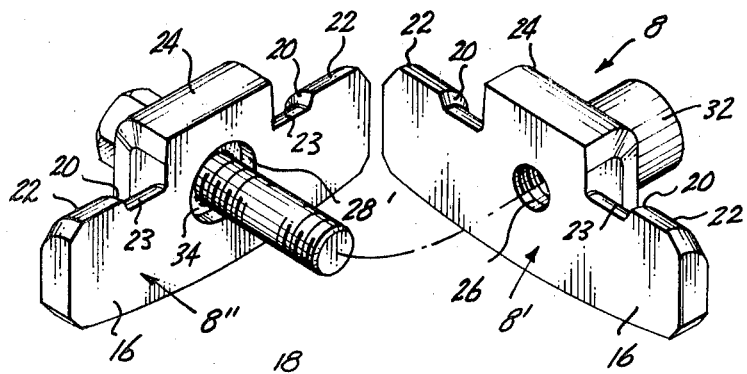
FIG. 2 is a perspective view of a device for coupling the containers together, there being separable interlock members in the device which have been disconnected from one another in the view.
Figure 3:
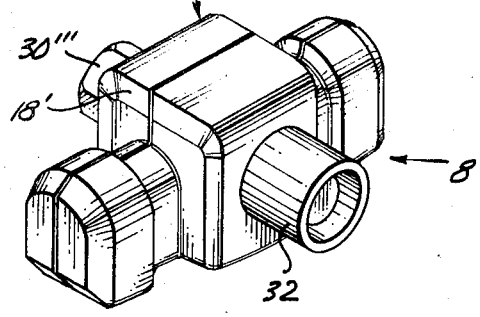
FIG. 3 is another perspective view of the coupling device in which the interlock members have been reconnected for use.
Figure 4:
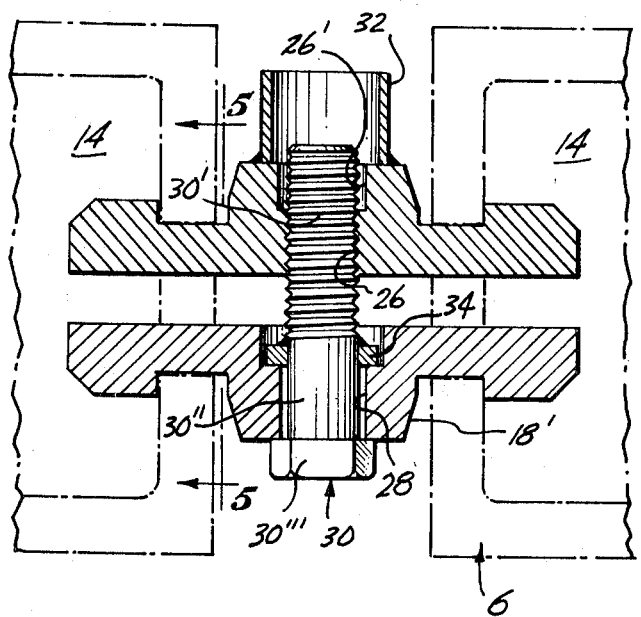
FIG. 4 is a part cross-sectional view of the device as it is used in coupling together one corner of the containers in FIG. 1, the fittings at that corner being illustrated schematically therein.
Figure 5:
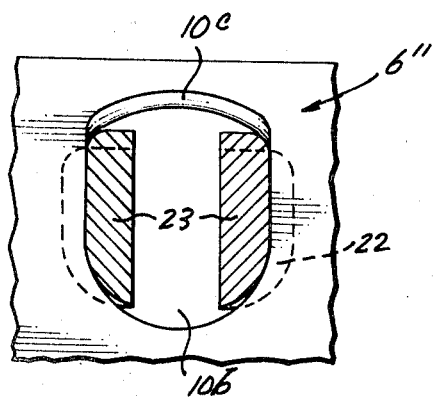
FIGS. 5 and 6 are part cross sectional views along the line 5-5 of FIG. 4, but illustrating an upper and a lower corner fitting in the arrangement, respectively, to show the difference in cross section of the slots in the respective fittings.
Figure 6:
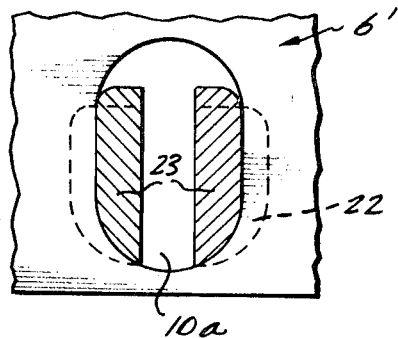

Referring to the drawings, it will be seen that the cargo containers 2 in FIG. 1 have parallelepipedal configurations, and are reinforced by marginal frames 4 therearound. A standard USASI/ISO hollow parallelepipedal casting 6 is welded or otherwise integrated with the corner of each frame on each container, to provide a female fitting for the male coupling device 8 illustrated in FIGS. 2 and 3. A separate coupling device is employed between registering corners, after the cargo containers are aligned end to end with one another to form a standard modular unit of two or more containers. The fittings 6 have slotted openings 10 in the outwardly exposed vertical walls 12 thereof, through which the male device 8 can be inserted into the cavities 14 of the fittings (FIG. 4). The openings 10' in the lateral walls 12' of the fittings are similarly sized and shaped; however, the openings 10'' in the end walls 12'' of the fittings vary from one another, depending on whether the fitting is disposed at the top or the bottom of the container. More specifically, the end openings 10a in the bottom fittings 6' have vertically elliptical cross sections which are somewhat narrow at the waist. See FIG. 6. On the other hand, the end openings 10b of the upper fittings 6'' are more oblate, and the elliptical cross section of the same is somewhat truncated at the top, where the upper edges 10c of the openings are rounded in the axial direction thereof. See FIG. 5.

The male coupling device 8 comprises a pair of matching interlock members 8' and 8'' which are complementarily truncated to have flat complemental faces 16 thereon which are oppositely disposed in use so as to mate with one another when the device is inserted in the openings of the fittings. Together, the members form an elongated, solid generally parallelepipedal body 18 (FIG. 3) which is chamfered or rounded in most cross-sectional planes thereof, and also axially inwardly tapered on one side, in the endwise direction along the relieved end portions thereof. The body also has spaced circumferential grooves 20 therein, in intermediate transverse planes thereof, spaced axially inward from the ends of the body. The resulting stepped axial cross section of the body provides a pair of oppositely disposed lugs or flanges 22 on each neck 23 of the body (FIG. 4), and as seen in FIG. 4, the aggregate diameter of the flanges is less than that of the end openings 10 of the fittings, in every plane thereof. Moreover, the width of the grooves 20 is such as to accommodate the edge portions of the walls 12 of the fittings so that they can be received therein as illustrated.

In addition to the above features, the relatively enlarged or raised center portions 24 of the members have transverse bores 26 and 28 therethrough which are aligned with one another on a perpendicular to the faces 16 of the members when the members are mated. The bores have differing characteristics from one another, however, in that as best seen in FIG. 4, the bore 26 in the upper member is threaded to receive the complementally sized and threaded shank 30' of a machine bolt 30, whereas the bore 28 of the lower member is relatively oversized to the unthreaded portion 30" of the shank. Each of the bores 26 and 28 is counterbored from the upper side in FIG. 4; that is, the bore in the upper member is counterbored from the outside, whereas the bore 28 in the lower member is counterbored from the flat face thereof. Neither counterbore 26' or 28' is directly exposed, however, since the counterbore 26' in the upper member has a short nipple 32 welded thereabout, on the same axis as the bore 36 therein.

The machine bolt 30 provides a means for interconnecting the members 8' and 8", as well as a means for causing relative displacement of the members along a norm to the faces 16 thereof. The displacement is effected either by the head 30''' of the bolt, or by a thick washer 34 which is welded to the unthreaded shank portion 30" of the bolt and seated in the counterbore 28' of the lower member. Thus, the raised center portion 24 of the lower member is effectively loosely clamped between the washer 34 and the head 30''' of the bolt, and will undergo displacement in relation to the upper member in response to rotation of the bolt. The nipple 32 protects the projecting end of the bolt, which may be unthreaded to prevent its escape.

The displacement action of the bolt is employed specifically as a means for interengaging the male device 8 with and between the opposing fittings 6 of the cargo containers. Referring still to FIG. 4, it will be seen that the device 8 is inserted into the end openings 10" of registering fittings 6 of adjacent containers. After the containers are in position and the device is loosely in place, the bolt 30 is turned to spread the members 8' and 8" apart until the edge portions of walls 12 are received in grooves 20, and the necks 23 and flanges 22 of the members are abutted therewith to interengage the device with each container. The bottom devices provide maximum bearing area on the walls 12 of the fittings, as in FIG. 6, since these devices are in tension in the unit. The shape of the flanges is not critical in itself so long as they have adequate bearing area to do the work of the unit.

The width of the raised center portion 24 of the device 8 enables the unit in FIG. 1 to comply with the standard maximum lengths prescribed by USASI/ISO. The chamfer 18' on the center portion facilitates alignment of the containers 2 during the installation of the device 8.

We claim:

1. In combination, a pair of spaced, mutually aligned cargo containers having pairs of spaced, oppositely disposed lugs thereon, and a spindle-connected coupling mechanism including a pair of oppositely disposed interlock members which are interposed in the clearance between the container and outwardly and inwardly displaceable in relation to one another on the spindle, to couple and uncouple the containers to and from one another, respectively, the bodies of which members are elongated along a common axis extending in the direction of alignment of the containers, and complementarily truncated in the plane of said axis so as to have mutually opposing planiform surfaces thereon which extend the full length thereof and mate with one another in the relatively inwardly displaced inoperative condition of the members, to unite the members in a single geometrical form, and the corresponding end portions of which members are inserted between the lugs on the containers and equipped with oppositely disposed recesses to receive the lugs on the containers in the relatively outwardly displaced operative condition of the members, which recesses open in the directions relatively away from the plane of the surfaces, and are spaced apart from one another lengthwise of the members by relatively central portions thereof which are raised above the bottoms of the recesses in the latter directions to form abutment walls against which the lugs can bear when the containers tend to undergo movement relatively toward one another.

2. The combination according to claim 1 wherein the central portions of the bodies of the members are raised in the directions relatively away from the plane of the surfaces to a greater extent than the end portions of the members.

3. The combination according to claim 4 wherein the one member has a recess in the surface thereof through which the spindle extends between the members, and one of the stops is formed on the spindle in the recess.

4. The combination according to claim 1 wherein the members are rotatably engaged on the spindle and the spindle has spaced stops thereon, between which one member is loosely clamped to the spindle, so that relative displacement between the spindle and the other member operates to spread the members apart.

5. The combination according to claim 4 wherein the spindle and the other member are threadedly interconnected with one another.

6. The combination according to claim 5 wherein the members have mutually aligned bores in the surfaces thereof, and there is a machine bolt rotatably journaled in the bores, in threaded engagement with one member, and equipped with a flange on the shank thereof, at a point between the members, to enable the other member to be separated from the one member by rotating the bolt.

7. The combination according to claim 1 wherein the cargo containers have hollow, slotted fittings in the opposing corners thereof, and there is a paired interlock member and spindle assembly interposed between each pair of opposing corner fittings, in engagement with the edge portions of the slotted end openings in the fittings.